Feb. 17, 1931.   R. B. WILLIAMSON   1,792,720
DYNAMO ELECTRIC MACHINE
Filed Oct. 6, 1924

Inventor
R. B. Williamson
by
Attorney

Patented Feb. 17, 1931

1,792,720

UNITED STATES PATENT OFFICE

ROBERT B. WILLIAMSON, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

DYNAMO-ELECTRIC MACHINE

Application filed October 6, 1924. Serial No. 741,899.

This invention relates to the ventilation of dynamo electric machines.

The ventilation of dynamo electric machines is a difficult problem, particularly in large machines. It is desirable to thoroughly ventilate not only the core in which the conductors are embedded but also the conductors themselves and also the rotor and its conductors. It is an object of the invention to provide means for accomplishing the foregoing results.

It is also an object to provide means whereby various elements of a dynamo electric machine may be supplied with ventilating fluid which has not already passed over long paths and thus preheated. It is a further object to cool the various elements of a dynamo electric machine by ventilating fluid that flows over comparatively short paths.

A more specific object is to provide means whereby the various elements of a dynamo electric machine may be cooled by approximately independent streams of ventilating fluid.

A further object is to provide means whereby a dynamo electric machine may be ventilated in a simple and efficient manner. Other objects will appear hereinafter as the description of the invention proceeds.

The novel features of the invention will appear from this specification and the accompanying drawings forming a part thereof and showing one embodiment of said invention and all these novel features are intended to be pointed out in the claims.

Figure 1:
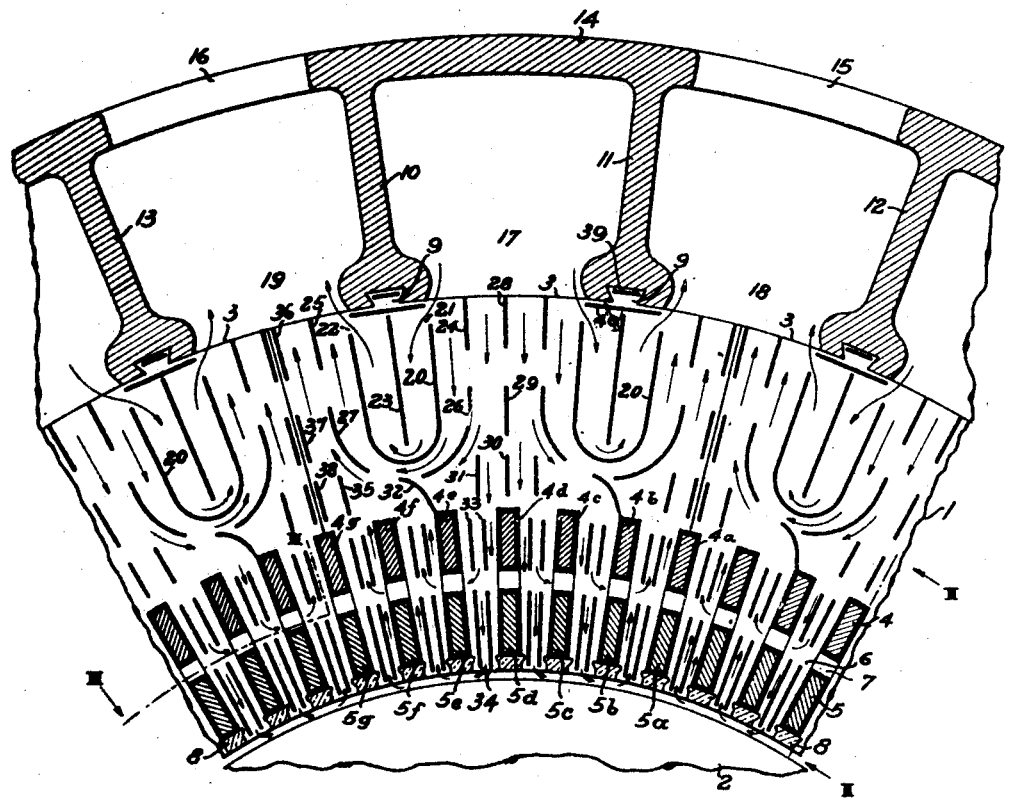
Fig. 1 is a fragmentary transverse section, taken in the general plane of a vent duct, of a dynamo electric machine embodying the invention.
Figure 2:
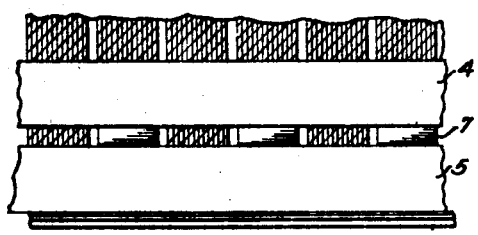
Fig. 2 is a fragmentary sectional view along the line II—II of Fig. 1, looking in the direction of the arrows.

Referring to the drawings, the stator 1 of the dynamo electric machine here shown cooperates with a rotor 2 spaced from the stator to form the usual air gap. In the instance shown, the rotor would be the field member and is usually provided with field conductors, not shown. The stator 1 is built up out of sector-shaped laminæ 3 provided on the inner periphery thereof with slots so that rows of conductors 4, 5 may be embedded therein. The slots form teeth 6. A given conductor 4 is here shown as separated radially from a given conductor 5 in the same slot by means of a spacer 7 preferably of insulating material. The spacers 7 do not extend the full axial length of the conductors as may be seen from Fig. 3, but in the instance shown extend from the edge of one transverse radial vent duct 41, for example, to the edge of the next transverse radial vent duct 42, thus leaving a peripheral passage between the respective radially superposed conductors at each vent duct. The conductors may be retained in the slots by any suitable form of wedges 8.

Figure 3:
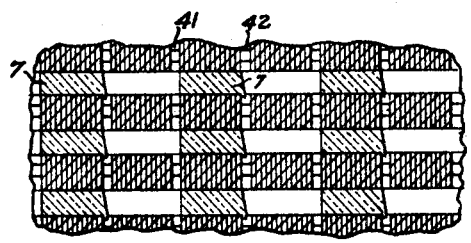
Fig. 3 is a fragmentary sectional view along the line III—III of Fig. 1, looking in the direction of the arrow.

Each individual lamina 3 may be provided with any suitable means such as the dovetails 9 to position and fasten them to radial ribs 10, 11, 12, 13 provided with dove-tail slots, forming part of the stator yoke. The stator yoke is provided with a peripheral wall 14, here shown as provided with a plurality of outlets 15, 16. The walls 10, 11, 14 form a chamber over the stator core into which air or other ventilating fluid may be admitted at, for example, an axial end of the dynamo electric machine. The walls 10, 11 thus also form an inlet 17 where air may enter vent ducts such as 41, 42, etc. (Fig. 3). The walls 11, 12 and 10, 13 form outlet chambers through which air may leave from the outlet openings 18, 19, thus formed, and from the yoke outlets 15, 16 respectively. It is of course to be understood that the inlet and outlet chambers alternate with each other all around the periphery of the machine.

The laminæ 3 shown in Fig. 1 are those constituting one wall of a vent duct or radial ventilating passage such as 41. These laminæ are provided with spacers, many of which also act as baffles, or guides as will be more fully set forth. A U-shaped baffle 20 is provided radially below the wall 10 and so shaped and disposed that air may enter the U-shaped spaces thus formed from the inlet 17 through an opening 21 and leave said space at an opening 22 from where it passes through the outlet 19 and eventually from the machine through outlet 16. A radial baffle 23 may be provided within the U-shaped baffle 20 in order to cause air entering at opening 21 to travel radially inward to the arcuate end of the U-shaped baffle before again leaving by way of opening 22. Another substantially U-shaped path for air is provided by means of the radial baffles 24, 25, disposed peripherally further away from the general plane of wall 10 and on opposite sides thereof, along with the arcuate baffles 26, here shown as having their ends spaced from each other and from the baffles 24, 25. As indicated by the arrows, some air is directed along this U-shaped path from the inlet 17 to the outlet 19. Spaced radial baffles 28, 29, 30 are here shown as provided on a line substantially half way between walls 10, 11. Another radial baffle is disposed between baffle 30 and baffle 26. An arcuate baffle 32 is provided between the radially outer locus of the row of conductors 4 and about radially below the U-shaped baffles hereinabove described. One or more spacers 33 are provided on the tooth portions of the laminæ between each pair of conductors 4. These spacers 33, preferably, do not extend radially inward further than the radially innermost edge of the row of conductors 4, in order that the space between conductors 4 and 5 will be left open. One or more spacers 34 disposed between the several conductors 5 are also provided to brace the ends of the teeth. These spacers should preferably not extend further radially outward than the radially outermost edge of the row of conductors 5. A radial baffle 35 is provided radially below baffle 27 and peripherally to the left thereof. Radial baffles 36, 37, 38 here shown as spaced from each other are provided along the left hand edge of lamina 3. These spacers also serve as baffles.

The spacers and baffles hereinabove described are repeated on lamina 3 between the line of baffles 28, 29, 30 and the right hand edge of said lamina. All the other laminæ 3 are preferably provided with spacers and baffles similarly arranged.

Spacers 39, 40 may be provided in order to better brace the dove-tails 9 and that portion of the laminæ adjacent the yoke.

The principal paths which ventilating fluid may follow will now be described. When air under pressure is admitted to chamber 17, some of it, as already mentioned, enters opening 21 and also the gap between baffle 20 and baffle 24. This air follows a generally U-shaped path, as indicated by the arrows, from inlet 17 to outlet 19 and efficiently cools the major part of the core surface. Another portion of the air admitted through inlet 17 passes between baffles 24 and 28 most of it going radially inward and between conductors 4e, 4d. A portion of this air passes between conductors 4e and 5e eventually proceeding radially outward, as indicated by the arrows. Another portion of the air which passes radially inward between conductors 4e and 4d continues onward and passes between conductors 5e and 5d and when it reaches the air gap between the stator and rotor it turns to the left as indicated by the arrow. Eventually this air passes radially outward between conductors 5e, 5f, and 5f, 5g, respectively, eventually reaching the outlet 19. Some air also passes between conductors 4f and 5f as indicated by the arrow. It will be noted that the baffle 32 serves to cause most of the air coming radially inwards between baffles 26, 29 to go between conductors 4e, 4d. A small part of it assumes a U-shaped path radially below the baffle 26. On the right hand side of baffle 28 some of the air passes radially inward, then divides and some of it passes between conductors 4d, 4c and between conductors 4c, 4b. Some of this air as indicated by the arrows, passes between conductor 4c, 5c and conductors 4b, 5b, respectively. Another portion continues radially inward eventually reaching the air gap and passing toward the right and then radially outward between conductors 5a, 5b from where it proceeds and finally reaches the outlet 18. The U-shaped paths on the right hand side of lamina 3 are substantially the same as already described for the left side.

The radial baffles 32 are preferably extended radially inwards so as to leave no air gap between, for example, conductor 4e and the baffle. This prevents air from being blown across the path of the air moving between conductors 4e and 4f, for example.

It will be noted that approximately half of the air admitted through inlet 17 eventually reaches the outlet 19 and the other approximate half eventually reaches the outlet 18.

It should be understood that it is not desired to limit the invention claimed to the exact details of construction shown and described, for obvious modifications in the arrangement of the baffles and other parts may occur to a person skilled in the art.

It is claimed and desired to secure by Letters Patent:

1. In combination with a core for a dynamo electric machine having a radial ventilating passage, conductors radially spaced from each other and embedded in the inner periphery of said core, and means for directing air through said passage radially inward, circumferentially through the space between said conductors and in planes transverse to the longitudinal axis of said core, and radially outward.

2. In combination with a core for a dynamo electric machine having a radial ventilating passage, conductors peripherally spaced from each other and embedded in the inner periphery of said core, a second core disposed within and spaced from the inner periphery of said first core to form an air gap, and means for directing air through said passage between certain of said conductors radially inward, then circumferentially through said air gap and in planes transverse to the longitudinal axis of said core, and then radially outward between others of said conductors.

3. In combination with a core for a dynamo electric machine having a radial ventilating passage, conductors peripherally and radially spaced from each other and embedded in the inner periphery of said core, a second core disposed within and spaced from the inner periphery of said first core to form an air gap, and means for directing air through said passage between certain of said conductors radially inward, a portion of said air circumferentially between radially spaced conductors and in planes transverse to the longitudinal axis of said core, and another portion circumferentially through said air gap and in planes transverse to the longitudinal axis of said core.

4. In combination with a core for a dynamo electric machine having a radial ventilating passage, a second core disposed within and spaced from the inner periphery of said first core to form an air gap, and means for directing a flow of air under pressure through said passage radially inward to said air gap, and means for producing zones of lower pressure on opposite peripheral sides of said flow whereby said flow is caused to divide and flow in opposite circumferential directions in said air gap and in planes transverse to the longitudinal axis of said core.

5. In combination with a core for a dynamo electric machine having a radial ventilating passage, a second core disposed within and spaced from said first core to form an air gap, conductors embedded in the inner periphery of said first core, means for directing a flow of air under pressure through said passage radially inward toward said air gap, and means for producing zones of lower pressure on opposite peripheral sides of said flow whereby some of the air is caused to flow in opposite directions in said passage in planes transverse to the longitudinal axis of said core and that portion which reaches the air gap is caused to flow in opposite circumferential directions in said air gap and in planes transverse to the longitudinal axis of said core.

6. In combination, a core for a dynamo-electric machine, a second core disposed within and spaced from said first core to form an air gap, conductors embedded in the inner periphery of said first core, said first core having a radial ventilating passage extending from the outer to the inner periphery of said core and communicating with said air gap, means whereby a plurality of peripheral inlets for said passage are formed alternating with a plurality of outlets therefor, and radial baffle means disposed peripherally approximately half way between the edges of each outlet and extending substantially to the outer peripheral locus of said conductors.

7. In combination, a core for a dynamo-electric machine, a second core disposed within and spaced from said first core to form an air gap, conductors embedded in the inner periphery of said first core, said first core having a radial ventilating passage extending from the outer to the inner periphery of said core and communicating with said air gap, means whereby a plurality of peripheral inlets for said passage are formed alternating with a plurality of outlets therefor, and baffle means of general U-shape extending from a given inlet to an adjacent outlet, and similar baffle means extending from the same inlet to the other adjacent outlet, said U-shaped baffle means extending radially inward to leave a restricted passage between them respectively and the outer peripheral locus of said conductors.

8. In combination with a core for a dynamo-electric machine having a radial ventilating passage in a single plane, means whereby a plurality of peripheral inlets for said passage are formed alternating with a plurality of outlets therefor, conductors embedded in the inner periphery of said core, baffle means of general U-shape extending from a given inlet to an adjacent outlet, and similar baffle means extending from the same inlet to the other adjacent outlet, said U-shaped baffle means extending approximately to the locus of the radially outer periphery of said conductors, and baffle means having a radial component disposed between said locus and the inner end of said U-shaped baffle means.

9. In combination, a core for a dynamo-electric machine, a second core disposed within and spaced from said first core to form an air gap, conductors embedded in the inner periphery of said first core, said first core having a radial ventilating passage extending from the outer to the inner periphery of said core and communicating with said air gap, means whereby a plurality of peripheral inlets for said passage are formed alternating with a plurality of outlets therefor, baffle means of general U-shape extending from a given inlet to an adjacent outlet, and similar baffle means extending from the same inlet to the other adjacent outlet, said U-shaped baffle means extending radially inward to leave a restricted passage between them respectively and the outer peripheral locus of said conductors, and a radial baffle disposed peripherally approximately half way between the edges of each outlet and extending substantially to the outer peripheral locus of said conductors.

In testimony whereof, the signature of the inventor is affixed hereto.

ROBERT B. WILLIAMSON.